Figure 1:
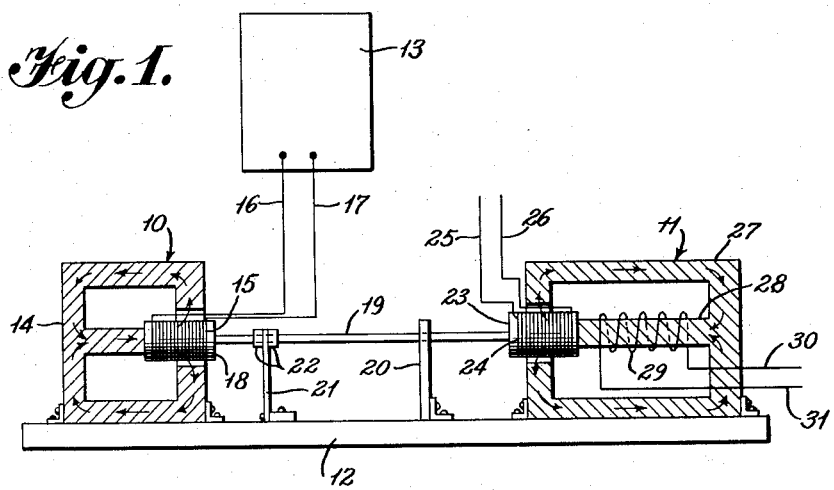

Jan. 20, 1959  R. W. OLSON  2,870,350
SIGNAL CONVERTOR
Filed April 10, 1953

INVENTOR
Robert W. Olson

BY Stevens, Davis, Miller & Mosher
ATTORNEYS 2,870,350

SIGNAL CONVERTOR

Robert W. Olson, Dallas, Tex., assignor to Texas Instruments Incorporated, Dallas, Tex., a corporation of Delaware Application April 10, 1953, Serial No. 347,893

4 Claims. (Cl. 310—27)

This invention relates to the amplification and recording of minute electrical signals and more particularly to a method and apparatus for converting minute direct current electrical signals into larger alternating current signals that can be more expediently and more accurately amplified and recorded.

Almost all electrical measuring instruments produce a direct current indicative of the phenomenon under observation. It is then necessary to convert this electrical current into the mechanical movement of a meter hand than can be seen, or the mechanical movement of the recording pen or the like that can be recorded, or the power to perform some control function. In many instances the electrical power generated by the measuring instrument is of a very low order of magnitude. Thus, measured as voltage the instrument may not be able to generate more than a very few microvolts of direct current or measured as current it may not be able to generate more than a few microamperes. Obviously, such low voltages and low currents are incapable of operating the necessary indicating or recording or controlling equipment and therefore it is necessary to amplify these signals to a very considerable degree before applying them to a final meter or recorder or control mechanism.

Direct current amplifiers have been used for this purpose but have been found wanting. Their use results in drift, instability, and generally inaccurate results. The conversion of the direct current signals into alternating current and the subsequent amplification of these signals by alternating current amplifiers has also been attempted and has proved to be generally more satisfactory. A difficulty occurs, however, in converting the very minute direct current signals into alternating current signals, for while it is easy enough to convert direct current into alternating current, it is also extremely easy to lose in the process such minute currents as those with which we are here concerned, and it is also very easy to introduce spurious currents in the process of conversion that make the final results inaccurate.

According to the present invention, it has been discovered that if a coil of wire is oscillated at a constant rate in a flux field created by the direct current to be measured, an alternating current voltage can be generated in the coil that is quite accurately proportional to the direct current to be measured and yet is much larger in magnitude and hence easily amplified by an alternating current amplifier.

It is important to this invention that the coil in which the alternating current is to be generated be oscillated back and forth in a straight line along its axis and that the rate of oscillation be held constant so that the frequency of the alternating current generated will be constant and its amplitude proportional only to the direct current to be measured and not affected by any change in frequency of oscillation.

It is also important to this invention that the minute direct current be caused to generate as much flux as possible and that this flux be confined as closely as possible to a path that passes through the alternating current generating coil.

It is also important to this invention that the flux path include only materials of extremely low hysteresis in order that there be the least possible resistance to change in flux density with changes in direct current.

It is also important that the coil in which the alternating current is generated be connected to a relatively high impedance so that no appreciable current can flow in the coil, thus avoiding the generation of counter flux by the coil itself, which flux would interfere with accurate measurement.

Further details and advantages of this invention will be apparent from a consideration of the embodiments shown in the drawings.

Figure 2:
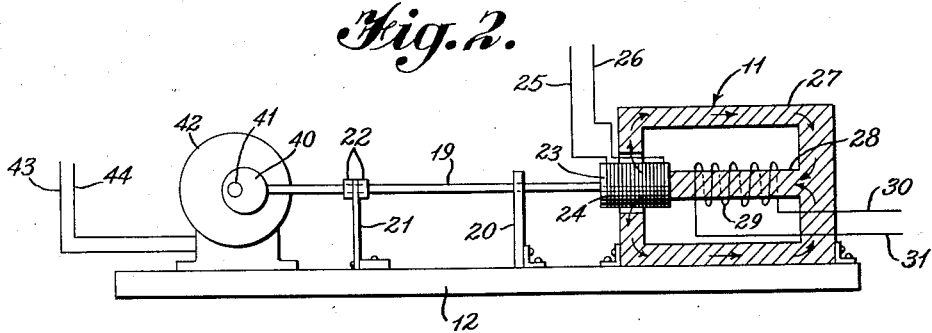

In the drawings:

Figure 1 is a diagrammatic illustration of the preferred embodiment of the signal convertor of this invention; and Figure 2 is a diagrammatic illustration of an alternative embodiment of this signal convertor.

The signal convertor of this invention as illustrated in Figure 1 consists fo a power unit generally designated as 10, a driven unit generally designated as 11, a base 12 upon which these units are mounted, and a oscillator 13 for supplying electrical power to the driving unit. The oscillator 13 is conventional in form and need not be further described except to state that it is constructed so that it will supply constant frequency, constant amplitude current to the power unit 10.

The power unit 10 consists of a core member 14, suitably shaped to cooperate with a movable coil 15 and permanently magnetized so that the coil 15 will always be operating in a permanent magnetic field. This permanent magnet core member 14 is suitably attached to the base 12. The coil 15 is connected by conductors 16 and 17 so as to be supplied with alternating current from the oscillator 13. It is wound on a cup-shaped form so that the permanent magnet core 14 can extend inside the cup and around the cup to produce a high flux density through the windings thereon. A cup-shaped coil support 18, which carries the coil 15, mounted on one end of a horizontally extending rod 19 which is slidably supported in an angle member 20 attached to the base 12 and also in one end of a leaf spring 21, the lower end of which is attached to the base 12 and the upper end of which is attached to the rod 19 by having the rod pass through an opening therein and having a pair of collars 22 fixed to the rod, one on each side of the leaf spring 21.

At the end of the rod 19 opposite the power unit 10 there is affixed to the rod a cup-shaped coil form 23 which carries a helical winding 24. Conductors 25 and 26 lead from this winding to the input of an alternating current amplifier or the like.

Surrounding the winding 24 is another core member 27 somewhat similar in shape to the core member 14 of the driving unit but constructed of a low reluctance material that exhibits very little hysteresis. This core member 27 is aslo mounted on the base 12 and it has two outer arms, or an outer shell that approaches the outside of the coil 24 and an inner arm 28 that extends into the inside of the coil 24, thus forming a magnetic circuit having relatively short air gap or gaps. Surrounding the inner arm 28 of this core is a signal coil 29 which is connected by conductors 30 and 31 to the source of the signal which may be any type of measuring instrument that generates a small direct current indicative of the measurement being made or any other source of minute electrical currents to be amplified.

In operation, the two coils 15 and 24 and the rod 19 that connects them, all oscillate at a constant rate and at constant amplitude as a result of the interaction between the magnetic field supplied by the permanent magnet core 14 and the current supplied by the oscillator 13. It is preferred to have the natural frequency of oscillation of this assembly such that it will correspond quite closely to the frequency of the oscillator. This can be accomplished by proper design of the leaf spring 21 which is flexed with the oscillation. With the coils oscillating at constant frequency and constant amplitude the signal current is applied through conductors 30 and 31 to the coil 29 so that flux is generated in the air gap of the core 27 and this flux passes through the moving coil 24. The result is the generation in that coil of an alternating current of much greater magnitude than that of the direct current and this current passes through the conductors 25 and 26 to the input of an alternating current amplifier (not shown).

A modified form of signal convertor is illustrated in Figure 2. This form of signal convertor differs from the form shown in Figure 1 only in the method and apparatus by which the oscillating shaft 19 is driven. As illustrated in Figure 2, the end of the oscillating shaft 19 bears against a cam 40 mounted on the end of the shaft 41 of a constant speed motor 42 which is mounted on the base 12 of the device in place of the driving mechanism 10 of Figure 1. The constant speed motor 42 is supplied with current from conductors 43 and 44 and is preferably a synchronous motor supplied with alternating current so that the speed will be certain to be constant. The leaf spring 21 serves to return the rod 19, that is to hold it against the surface of the cam 40. This construction is otherwise identical with that of Figure 1.

It will at once be apparent that various modifications may be made in the device illustrated in Figures 1 and 2 without departing from the spirit or scope of this invention as defined by the appended claims.

What is claimed is:

1. A device for converting small direct current signals into corresponding alternating current signals that comprises a cylindrical conductor coil, means to reciprocate said conductor coil in an axial direction, at a constant rate and at a constant amplitude, means forming a low hysteresis flux path into one end of said cylindrical coil, and outward through said cylindrical coil, and returning to the point of origin, and means to apply said small direct current signals to create flux in said path.

2. A device for converting small direct current signals into proportional alternating current signals that comprises a cylindrically shaped coil, means forming a low hysteresis path through said coil, means for applying said small direct current signals to create flux in said path, a rod connected to said cylindrically shaped coil for reciprocation thereof at a constant rate and at a constant amplitude, a leaf spring connected to said rod to assist in controlling its movement, and driving means connected to said rod to reciprocate at a constant rate and at a constant amplitude.

3. A device as defined in claim 2 in which the driving means for said rod comprises a cylindrically shaped coil mounted on said rod, an oscillator supplying electrical current to said coil at a constant frequency and a constant amplitude and means for generating a constant magnetic field around said coil.

4. A device as defined in claim 2 in which the means for driving said rod comprises a constant speed electrical motor and a cam carried on the shaft of said motor and contacting an end of said rod.

References Cited in the file of this patent

UNITED STATES PATENTS

| | | |
|---|---|---|
| 2,004,780 | Churcher | June 11, 1935 |
| 2,342,628 | Ejeven et al. | Feb. 29, 1944 |
| 2,347,200 | Lehde | Apr. 25, 1944 |